May 15, 1951  A. P. WIANCO  2,553,027
AUTOMATIC FLUID TEMPERATURE CONTROLLER
Filed Dec. 20, 1948  2 Sheets-Sheet 1
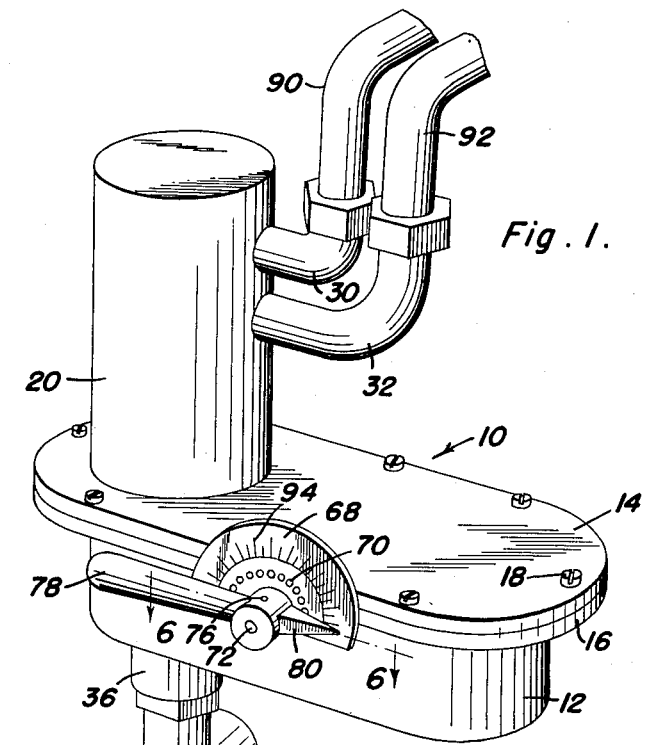
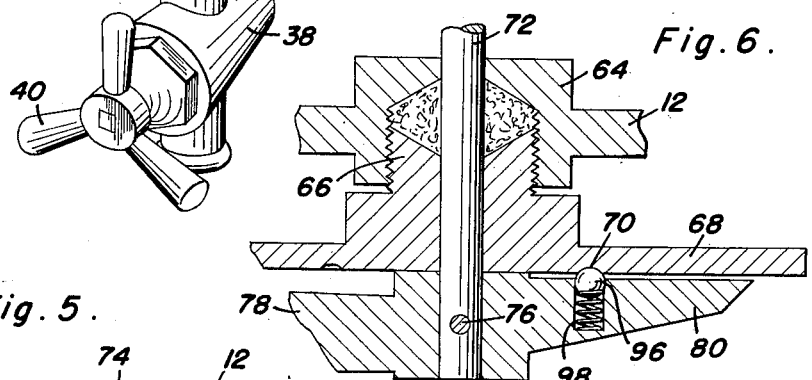
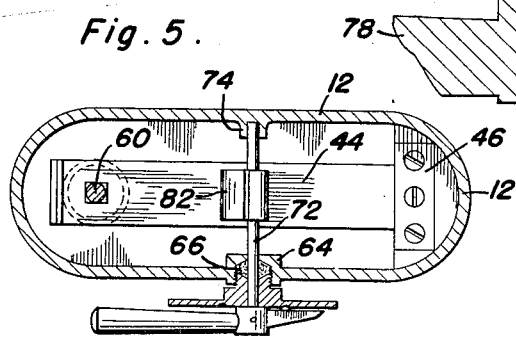
Albert P. Wianco
INVENTOR.

May 15, 1951 A. P. WIANCO 2,553,027
AUTOMATIC FLUID TEMPERATURE CONTROLLER
Filed Dec. 20, 1948 2 Sheets-Sheet 2
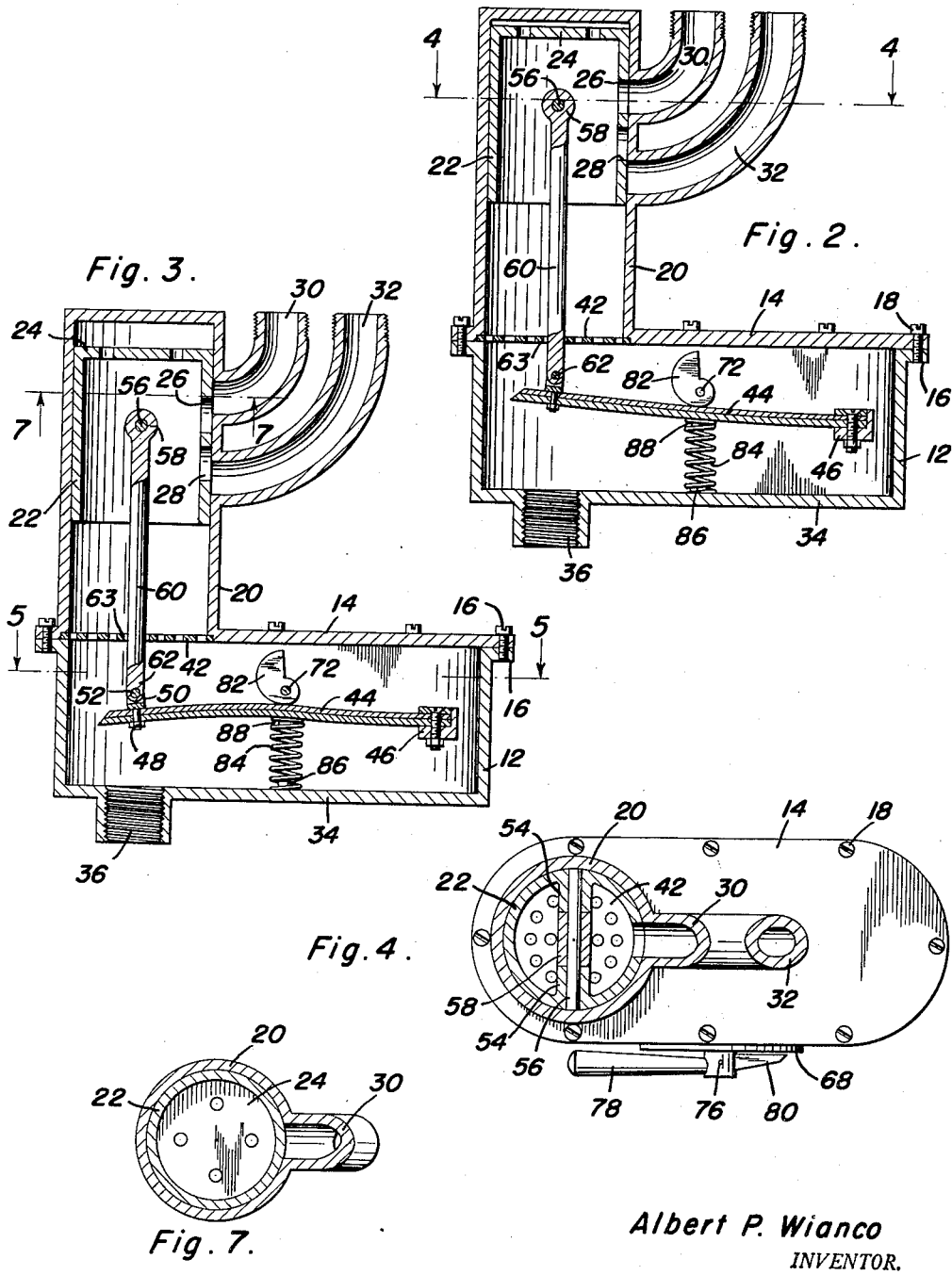
Albert P. Wianco
INVENTOR.

Patented May 15, 1951

2,553,027

UNITED STATES PATENT OFFICE 2,553,027

AUTOMATIC FLUID TEMPERATURE CONTROLLER

Albert P. Wianco, Florence, Colo.

Application December 20, 1948, Serial No. 66,202

2 Claims. (Cl. 236—12)

1

This invention relates to new and useful improvements in thermostatic controls and the primary object of the present invention is to provide a device for maintaining the fluid delivered from a discharge conduit at a predetermined temperature.

Another important object of the present invention is to provide a thermostatic control device including a valve housing having inlet and outlet means, a thermostatic flexible member responsive to the temperature of a fluid in the housing for moving a valve to control the inlet means, and embodying novel and improved means for limiting the flexing movement of said thermostatic member so that the fluid passing from the outlet means will be at a selected, predetermined temperature.

A further object of the present invention is to provide a thermostatic control for shower heads and the like including a housing having a passage through which a liquid is directed and means mounted in the housing tending to retain a straight line flow pattern of fluid passing through the housing.

A still further aim of the present invention is to provide an automatic water temperature controller that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is perspective view of the present invention in position for use;

Figure 2 is a longitudinal vertical sectional view of the present invention;

Figure 3 is a view similar to Figure 2 and showing the bi-metal arm flexed slightly;

Figure 4 is a transverse horizontal sectional view taken substantially on the plane of section line 4—4 of Figure 2;

Figure 5 is a transverse horizontal sectional view taken substantially on the plane of section line 5—5 of Figure 3;

Figure 6 is a fragmentary horizontal sectional view taken substantially on the plane of section line 6—6 of Figure 1; and, Figure 7 is a transverse horizontal sectional

2 view taken substantially on the plane of section line 7—7 of Figure 3.

Referring now to the drawings in detail, wherein for the purpose of illustration, there is disclosed a preferred embodiment of the present invention, the numeral 10 represents the housing or casing that is used in conjunction with the present invention generally, including a lower hollow member or portion 12 having a removable upper wall 14 that is secured to the outwardly turned flange portion 16 of the member 12 by fasteners 18.

A tubular post or valve housing 20, closed at its upper end, rises from the wall 14 and slidably receives a cylindrical valve 22 that is open at its lower end and which is provided with a perforated plate 24 at its upper end. The valve 22 is provided with a pair of spaced openings 26 and 28 that are adapted to communicate with the inlet ends of a pair of arcuate, hot and cold liquid or fluid inlet conduits or nipples 30 and 32 which form an integral part of the post 20.

The conduits 30 and 32 are spaced sufficiently to permit the opening 28 to be disposed between the same with the opening 26 above inlet end of the conduit 30 when the valve is moved to a closed position.

Projecting outwardly from the lower wall 34 of the member 12 and co-axially disposed with the post 20, is an outlet nipple 36 to which there is removably secured a valve housing 38 having a valve mounted therein which is manually operated by a hand grip 40 to regulate the quantity of liquid passing from the housing 10.

Suitably secured to the lower end of the post 20, is a perforated plate 42 that will prevent currents forming in the housing and a liquid passes therethrough and which will tend to retain a straight line flow pattern of liquid passing through the housing 10.

The numeral 44 represents a thermostatic member or bi-metal arm having one end detachably secured to a suitable support bracket 46 mounted in the member 12. The free end of the bi-metal arm 44 supports a fastener 48 from which there projects a pair of ears 50 that are connected by a pivot pin 52.

Integrally formed with the inner periphery of the valve 22, is a pair of diametrically disposed, co-axial sleeves 54 between which there extends a pin 56.

The pin 56 is received in an upper sleeve or eye 58 at the upper end of a pitman or pusher link 60, and the pin 52 is received in a lower eye or sleeve 62 at the lower end of the link 60.

The pusher link 60 is slidably received in a diametrical slot 63 provided in the central portion of the perforated plate 42 and by such a construction it is apparent that valve 22 is slidable in the post 20 but held against rotation since the pusher link 60 would bind against the edges of the opening 63 should the valve tend to rotate.

Receivably engaging an internally threaded sleeve or socket 64 formed with the member 12, is a sealing gasket 66 that is integrally formed with a preferably semi-circular locking plate 68 having a plurality of circumferentially spaced recesses 70.

A shaft or rod 72 extends through the sealing gasket 66 and socket 64 and the inner end of the shaft 72 is journaled for rotation in a socket or recess 74 provided in the member 12. To the outer end of the shaft 72 there is suitably secured, by pin or the like 76, a hand grip or handle 78 having a pointer 80.

The shaft 72 is disposed above and perpendicular to the arm 44 and the central portion of the shaft 72 supports a cam 82 that bears against the arm 44 at substantially the center thereof.

A coil spring 84 extends between substantially the central portion of the bottom wall 34 and the central portion of the arm 44 to normally urge the arm 44 against the cam 72, and the ends of the spring 84 embrace holding lugs 86 and 88 mounted on the wall 34 and arm 44 respectively to prevent disengagement of the spring from the wall 34 and arm 44.

In practical use of the present invention, the conduits 30 and 32 are coupled to the hot and cold water pipes 90 and 92 of a water system or to conduits leading to a source of hot and cold liquid or fluid.

The hand grip 78 is rotated until the pointer 80 registers with a selected indicating line or graduation 94 on the plate 68, at which time a spring urged locking ball 96, recessed partially in a seat 98 provided in the pointer 80, is received in the selected opening 70 in the plate 68, adjacent the selected indicating line 94, to retain the shaft 72 in a selected rotated position with the cam 82 bearing against the arm 44 to limit flexing movement of the arm 44.

Should the temperature of the liquid entering the housing and contacting the arm 44 raise or lower beyond that selected by the pointer 80 the arm will flex to move the valve 22 and thereby controlling the fluid entering the housing by the conduits 30 and 32. It being understood, that the arm 44 will flex in one direction should the temperature of the liquid in the housing 10 become below that selected, so that a greater amount of cold liquid may enter the housing in proportion to the hot liquid entering therein while the arm 44 will flex in an opposite direction should the temperature of the liquid in the housing 10 be higher than that selected, to move the valve 22 in order to permit a greater quantity of the hot liquid to enter the housing in proportion to the cool liquid, and thereby regulating the temperature of the liquid that is discharged from the housing 10.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An automatic fluid temperature controller comprising a housing having hot and cold fluid inlet conduits and a fluid outlet conduit, a valve slidably received in said housing for controlling the inlet conduits, a thermal responsive arm mounted in said housing for flexing movement, a link connecting the free end of said arm to said valve, said arm being responsive to the temperature of the fluid in said housing for flexing movement, said valve being moved relative to said inlet conduits during flexing movement of said arm for regulating the fluid entering the housing through said inlet conduits, a shaft journaled on said housing for rotation, a cam mounted on said shaft and bearing against said arm for restricting flexing movement of said arm, a spring member urging said arm against said cam, a handle secured to said shaft and disposed exteriorly of said housing for rotating the shaft, a locking plate detachably mounted on said housing and having a plurality of circumferentially spaced recesses, and a spring urged locking ball carried by said handle adapted for placement in a selected one of said recesses to retain said shaft in a selected rotated position.

2. An automatic liquid temperature controller comprising a housing including a hollow lower portion and an outlet conduit extending from the lower portion, a tubular post rising from the lower portion and closed at its upper end, the interior of said post being in communication with the interior of said lower portion, hot and cold inlet conduits secured to said post for supplying water into the lower portion, a bi-metal arm fixed at one end within the lower portion and having its free end disposed beneath the post, a valve slidably received in the post for controlling the flow of water into the housing through said inlets, a link having a lower end pivoted to the free end of said arm and an upper end pivoted to said valve, a perforated plate mounted within said housing at the lower end of said post and having a central opening slidably receiving and guiding said link, said plate tending to retain a straight line flow-pattern of liquid passing through said housing from said post, a rotatable shaft extending through said lower portion and disposed above and laterally of said arm between the ends of said arm, a cam mounted on said shaft and bearing against said arm intermediate the ends of said arm for limiting flexing movement of said arm, resilient means underlying the arm and yieldingly urging the arm against the cam, and means disposed exteriorly of the housing and engaging the shaft to retain the shaft in a selected rotated position.

ALBERT P. WIANCO.

REFERENCES CITED

The following references are of record in the file of this patent:

UNITED STATES PATENTS

| Number | Name | Date |
| --- | --- | --- |
| 1,954,903 | Walker | Apr. 17, 1934 |
| 2,211,481 | Scott | Aug. 13, 1940 |
| 2,296,917 | Garrett et al. | Sept. 29, 1942 |
| 2,298,095 | Dunham | Oct. 6, 1942 |